March 20, 1956  D. A. LUNDY  2,738,878
SELF-CLEANING ASH TRAY
Filed Oct. 13, 1953
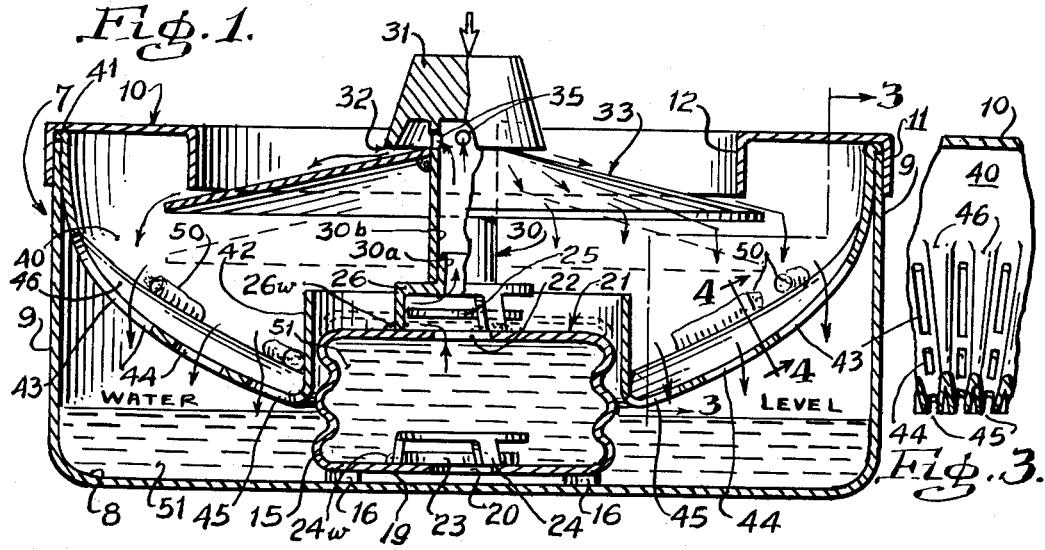
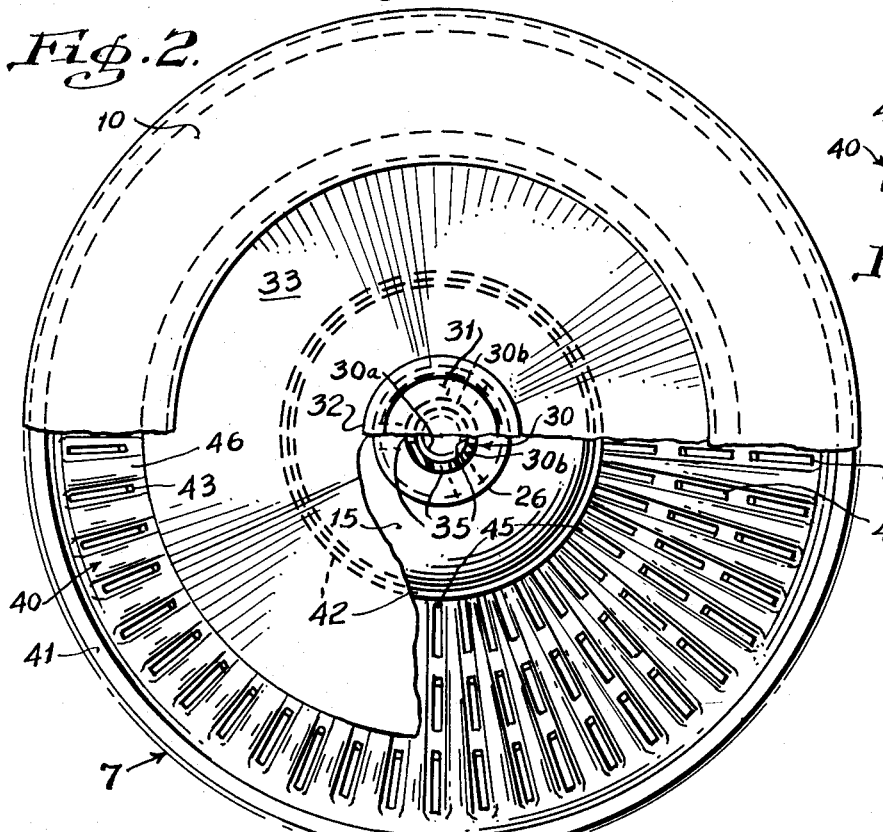
INVENTOR.
Daniel A. Lundy
BY Albert H. Merrill
ATTORNEY.

ize # 2,738,878
Patented Mar. 20, 1956

2,738,878
SELF-CLEANING ASH TRAY
Daniel A. Lundy, Los Angeles, Calif.

Application October 13, 1953, Serial No. 385,769

7 Claims. (Cl. 210—149)

This invention relates to a self cleaning ashtray and more particularly to an ashtray structure provided with a pumping means which is manually operable to supply a diffused sheet of water from a body of water contained within a receptacle which forms a part of the ashtray structure, in such a manner that said sheet of water cleans that visible portion of the ashtray structure which needs cleansing.

It is not new, in the art to which this invention pertains, to provide an ashtray structure with a casing or container part to receive a body of water used to quench the lighted cigar or cigarette stubs, and in at least one such patented structure a pump is used to replenish the water containing part of the device wherein the stubs are quenched. But so far as I am aware it is new in the art to which this invention pertains to provide a self cleaning ashtray structure with a pump means in combination with an upwardly facing plate member or disk, these parts being so arranged that water from the pump can be used to clean said exposed part after refuse from lighted cigars or cigarettes has been deposited thereon.

By means of this invention an ashtray structure is provided which can very readily and conveniently be kept in a sightly, neat appearing condition because the device provides manually operable pumping means which diffuses a sheet of cleansing water over the part of the device on which the refuse is deposited, this being quickly and easily done without the necessity of washing or wiping off the soiled surface portion.

A more specific object of the invention is to provide an improved combination of bellows like pump, or equivalent pump, with an upwardly facing plate or plate like member above said pump upon which the smoker's refuse is deposited, so that when said pump is operated liquid delivered therefrom cleans the upper surface of said member and maintains the device in a clean, neat appearing condition.

Other objects, advantages and features of the invention will hereinafter appear.

Referring to the accompanying drawing which illustrates a preferred embodiment of the invention, Fig. 1 is a vertical midsection of the complete device except that some parts are shown in side elevation. In this view the pump is shown in full lines in normal position and in broken lines with its top wall slightly depressed and a plurality of arrows indicate the resulting flow of water from said pump. The fully depressed position of the spreader member is indicated in broken lines.

Fig. 2 is a plan view of the structure shown in Fig. 1, certain upper parts being broken away so as to disclose underlying structure.

Fig. 3 is a fragmentary vertical section, the plane of section being indicated by angular line 3—3 on Fig. 1.

Fig. 4 is a sectional detail on line 4—4 of Fig. 1 showing how the basket is corrugated in cross section, with the space between its adjacent corrugations being less than the diameter of a cigarette.

Referring in detail to the drawing, a container 7 preferably circular as viewed in plan is provided, said container having a flat bottom 8 adapted to rest upon a horizontal supporting surface and an upstanding peripheral wall 9. Normally the mouth portion of said container is partly closed by means of a removable annular cover member 10 having a downwardly directed peripheral flange 11 which fits around the top portion of said container wall 9, said cover member having a downwardly directed inner flange 12.

Within the central portion of said container 7 there is mounted a bellows type pump 15, said pump being supported superjacent to the bottom of the container by means of plurality of foot members 16. Said bellows type pump is preferably made of synthetic rubber or flexible plastic material, for example, polyethylene. This pump comprises a bottom wall 19 furnished centrally with a bottom inlet port 20 and a top wall 21 furnished with a top outlet port 22. Said port 20 is provided with a check valve 23 which permits upflow only, this check valve being guarded by a spider like housing 24 which may be welded in place as indicated at 24w. Likewise the top port 22 is provided with a check valve 25 which permits upflow only, and a spider like housing 26 welded on as indicated at 26w keeps the latter check valve in its operative position.

A conduit 30 upstands from said housing 26. Said conduit 30 consists of a lower section 30a and a longer upper section 30b, the latter section fitting removably around the former and normally resting upon the top of the spider like housing 26. Preferably integral with the upper section of said conduit is a knob 31 which flares towards its lower end, being provided with a skirt portion 32.

To the upper end portion of said conduit 30 is secured in any suitable manner, such as welding, a broadly frustoconical spreader member 33, the peripheral portion of said spreader member substantially contacting with the lower end of the aforesaid flange 12 when the resilient or elastic pump structure already described is allowed to expand completely or nearly so. Between said spreader and the aforesaid knob 31 said conduit 30 is provided with a plurality of outlet openings 35, and when the knob 31 is forcibly depressed streams of water from the pump issue through said openings 35 and, by the skirt portion 32 of the knob are blended into a uniform sheet of spray or water which is directed radially outward over the spreader 33 and cleanses the upper surface thereof; and at such time, owing to the peripheral portion of the spreader being spaced downwardly from the flange 12, the sheet of water together with refuse which has been deposited upon the spreader is directed downwardly from the periphery of the latter as indicated by arrows in Fig. 1.

Within the container 7 is removably fitted a basket 40 shown as a bowl shaped member having a narrow outwardly directed peripheral flange 41 around its top, this flange resting upon the upper edge of the container wall 9 when the basket is in its operative position. Said basket carries centrally an upstanding tubular part 42 which loosely surrounds the aforesaid bellows pump 15. This tubular part is shown as being of an imperforate character, and the peripheral portion of the bowl shaped basket is also imperforate throughout its upper part. Between these two imperforate parts the entire wall portion of the basket is provided with a multiplicity of upper outlet slots 43, middle outlet slots 44, and lower outlet slots 45, it being understood, that the number and arrangement of these slots may be greatly varied without departing from the scope of the invention as later claimed. Said slots 43, 44, 45 are arranged in upwardly and downwardly inclined sets of longitudinally alined slots and between adjacent sets of three slots there are provided upwardly directed ribs 46. It is to be understood that this series of ribs extends entirely around the basket, but for convenience of illustration the ribs appearing in the background of Fig. 1 are not outlined in that view.

When the resilient pump 21 approaches its completely expanded condition the lower edge of the cover flange 12 engages the upper surface of the peripheral portion of the spreader member 33.

In Fig. 1 cigarette stubs 50 are shown deposited upon the basket 40, it being understood that the slots through said basket which have been mentioned are not wide enough to allow the cigarette stubs to pass downwardly into the body of water 51 contained in the lower part of the container, but are sufficiently wide to allow smaller refuse to pass down into said body of water. The basket 40 is corrugated in cross section, as shown in Fig. 4 of the drawings, with the space between its adjacent corrugations being less than the diameter of a cigarette. The purpose of thus constructing the device is to prevent the collected cigarette stubs from being successively wetted during washing out operations occurring after depositing said cigarette stubs in the device. The water does not wet the cigarette stubs because it flows along the bottom of the corrugations and out through the openings 43—45, while the stubs are held on top of the ribs 46 (as shown in Fig. 4) above the water flow.

When it is desired to clean the device, the annular cover member 10 is first removed and then, by taking hold of the knob 31 the operator will remove the upper section 30b of the conduit 30 together with the spreader 33. Thereupon the basket 40 will be removed and the cigarette stubs and the like resting thereon will be deposited into a suitable receptacle and the basket flushed with water under a faucet, and the body of liquid within the container will be dumped out and fresh water substituted. Then the parts may be replaced in their operative position for future use.

It will be noted that ashes may be dropped upon the spreader member 33 and cigarettes may be extinguished upon it. The spreader member 33 is then cleaned by water which removes both the ashes and the cigarette stubs 50, carrying them out of view of the user. The knob 31 is the actuating means for the entire cleaning operation. Depressing the knob 31 manually operates the pump 15, causing water to flow over the spreader member 33 and simultaneously moving it downwardly to discharge the refuse into the interior of the ashtray. Applicant's ashtray is accordingly self cleaning from a limited self-contained water supply.

I claim:

1. In a self-cleaning ashtray, a receptacle having a bottom to rest upon a horizontal supporting surface, a bellows type pump mounted centrally within said receptacle superjacent to the bottom thereof, said pump having a bottom port and a top port, a lower check valve permitting upflow only through said bottom port, an upper check valve permitting upflow only through said top port, said check valves controlling the flow of liquid from the lower portion of said receptacle up through the space enclosed by the bellows structure of the pump, a conduit communicating with said upper port and upstanding from said bellows pump, a spreader member carried by said conduit, a knob carried by said conduit in a superjacent relation to said spreader member, said knob being usable to depress said bellows pump and said bellows pump possessing a resiliency which expands it after pressure downwardly upon said knob has been released, there being outlet openings from said conduit superjacent to said spreader member to discharge upon the latter liquid from said pump, and a basket provided with a tubular central portion in a circumjacent relation to said pump, said basket having around its said tubular central portion a multiplicity of restricted outlets of a size to afford passage means for liquid laden with finely divided refuse to pass downwardly into a body of liquid in the lower portion of said container, said outlets being restricted sufficiently in size to prevent cigarette stubs and like material from passing through the basket.

2. The subject matter of claim 1, and said knob having a skirt portion which evenly distributes over said spreader member the liquid issuing from said outlets when said pump is operated by downward pressure upon said knob.

3. In a self cleaning ashtray, a container having an upstanding peripheral wall and a bottom to rest upon a horizontal supporting surface, a pump mounted centrally within said container superjacent to the bottom thereof, tubular operating means for said pump upstanding therefrom and manually depressible from a normally elevated position to direct a current of water upwardly from said position through said tubular means, said pump comprising resilient means normally maintaining said tubular means in its elevated position, a frusto-conical spreader carried by said tubular means in an upwardly spaced relation to said pump, there being valve controlled passage means through said pump and said tubular means to convey liquid from the lower portion of said container to the upper surface of said spreader to overflow the upper surface and the periphery of the latter, and a perforated basket structure spanning the space between said pump and the upstanding wall of said container, the perforations of said basket structure being sufficiently restricted to arrest the passage through said basket of cigarette stubs and the like deposited thereon.

4. The subject matter of claim 3, and an annular cover member normally resting upon the top of said receptacle, said cover member having an annular inner flange depending therefrom normally in contact with the upper surface of the peripheral portion of said spreader to seal off the interior of the ashtray from sight and to prevent odors from escaping therefrom.

5. In a self cleaning ashtray, a container having an upstanding peripheral wall and a bottom to rest upon a horizontal supporting surface, a pump mounted centrally within said container superjacent to the bottom thereof, tubular operating means for said pump upstanding therefrom, and manually depressible from a normally elevated position to direct a current of water entrained from the lower part of said container upwardly from said pump through said tubular means, said pump comprising resilient means normally maintaining said tubular means in its elevated position, said tubular means comprising a detachable upper portion, a spreader means carried by said detachable tubular portion and positioned to spread out radially water conveyed thereto by said pump, and a bowl shaped perforated basket normally fitted within and supported by said upstanding wall of said container, said basket having a spacious central opening through its bottom surrounding said pump.

6. The subject matter of claim 5, said basket being corrugated in cross section, with the space between its adjacent corrugations being less than the diameter of a cigarette so that discarded cigarette butts are held on the top of said corrugations while water passes beneath them through the perforations of said basket.

7. In a self cleaning ashtray, a container adapted to hold a quantity of water, a pump centrally mounted within said container circumjacent to the bottom thereof, tubular operating means for said pump upstanding from the bottom of said container, resilient means normally maintaining said tubular means in elevated position, said tubular means being manually depressible from its normally elevated position to direct a current of water entrained from the lower part of said container upwardly from said pump through said tubular means, a spreader means carried by said tubular means and positioned to spread out radially water conveyed thereto by said pump, and a bowl-shaped perforated basket disposed within said container beneath said spreader means and above the level of the water in said container, the perforations of said basket being sufficiently restricted to arrest the passage through said basket of cigarette stubs and the like deposited thereon.

References Cited in the file of this patent

UNITED STATES PATENTS

| | | | |
|---|---|---|---|
| 999,537 | Zabranski | Aug. 1, | 1911 |
| 1,558,981 | Hall | Oct. 27, | 1925 |
| 1,829,844 | Altmayer | Nov. 3, | 1931 |
| 2,199,205 | Litschgi | Apr. 30, | 1940 |
| 2,620,805 | Page et al. | Dec. 9, | 1952 |

FOREIGN PATENTS

| | | |
|---|---|---|
| 23,129 | Great Britain | of 1900 |
| 484,857 | Great Britain | May 11, 1938 |